(12) United States Patent
Lee et al.

(10) Patent No.: US 10,534,980 B2
(45) Date of Patent: Jan. 14, 2020

(54) METHOD AND APPARATUS FOR RECOGNIZING OBJECT BASED ON VOCABULARY TREE

(71) Applicant: SAMSUNG ELECTRONICS CO., LTD., Suwon-si (KR)

(72) Inventors: Huijin Lee, Pohang-si (KR); Seung-Chan Kim, Hwaseong-si (KR); Sunghoon Hong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/804,867

(22) Filed: Nov. 6, 2017

(65) Prior Publication Data

US 2018/0349739 A1    Dec. 6, 2018

(30) Foreign Application Priority Data

Jun. 1, 2017 (KR) ........................ 10-2017-0068427

(51) Int. Cl.
*G06K 9/00* (2006.01)
*G06K 9/62* (2006.01)
*G06K 9/46* (2006.01)
*G06K 9/50* (2006.01)

(52) U.S. Cl.
CPC ......... *G06K 9/6224* (2013.01); *G06K 9/4671* (2013.01); *G06K 9/6212* (2013.01); *G06K 9/6226* (2013.01); *G06K 9/46* (2013.01); *G06K 9/50* (2013.01); *G06K 2209/21* (2013.01)

(58) Field of Classification Search
CPC .................................................. G06K 9/6224
See application file for complete search history.

(56) References Cited

U.S. PATENT DOCUMENTS

| 8,717,437 B2 | 5/2014 | Soatto et al. | |
| 2012/0221572 A1* | 8/2012 | Wang | G06F 17/30256 707/737 |
| 2013/0046793 A1 | 2/2013 | Reznik et al. | |
| 2013/0288403 A1* | 10/2013 | Chen | H01L 22/20 438/16 |
| 2014/0369607 A1* | 12/2014 | Patel | G06F 17/30247 382/201 |

(Continued)

FOREIGN PATENT DOCUMENTS

| JP | 5988879 B2 | 8/2016 |
| JP | 2016-194779 A | 11/2016 |

(Continued)

OTHER PUBLICATIONS

Dark Programmer, "Bag of Words Method." *Image Processing*. Feb. 19, 2014 (13 pages in Korean with English translation).

(Continued)

*Primary Examiner* — Stephen P Coleman
(74) *Attorney, Agent, or Firm* — NSIP Law

(57) ABSTRACT

A method and apparatus for recognizing an object may obtain, from an input image, feature points and descriptors corresponding to the feature points, determine indices of the feature points based on the descriptors, estimate a density distribution of feature points for each of the indices, and recognize an object included in the input image based on the estimated density distribution.

23 Claims, 15 Drawing Sheets

(56) References Cited

U.S. PATENT DOCUMENTS

| | | | | |
|---|---|---|---|---|
| 2015/0161474 | A1* | 6/2015 | Jaber | G06K 9/52 |
| | | | | 382/203 |
| 2016/0110602 | A1* | 4/2016 | Chujo | F24F 11/30 |
| | | | | 382/103 |
| 2017/0304732 | A1* | 10/2017 | Velic | G06K 9/00201 |

FOREIGN PATENT DOCUMENTS

| | | | |
|---|---|---|---|
| KR | 10-0651034 | B1 | 11/2006 |
| KR | 10-1619076 | B1 | 5/2016 |
| KR | 10-1689863 | B1 | 12/2016 |
| KR | 10-1706216 | B1 | 2/2017 |

OTHER PUBLICATIONS

Fei-Fei, Li, et al. "A Bayesian Hierarchical Model for Learning Natural Scene Categories." *Computer Vision and Pattent Recognition, 2005. CVPR 2005. IEEE Computer Society Conference on.* vol. 2. IEEE, 2005. 1-8. (8 pages, in English).

Nister, David, et al. "Scalable Recognition With a Vocabulary Tree." *Computer Vision and Pattern Recognition, 2006 IEEE Computer Society Conference on.* vol. 2. IEEE, 2006.(8 pages, in English).

* cited by examiner

FIG. 5
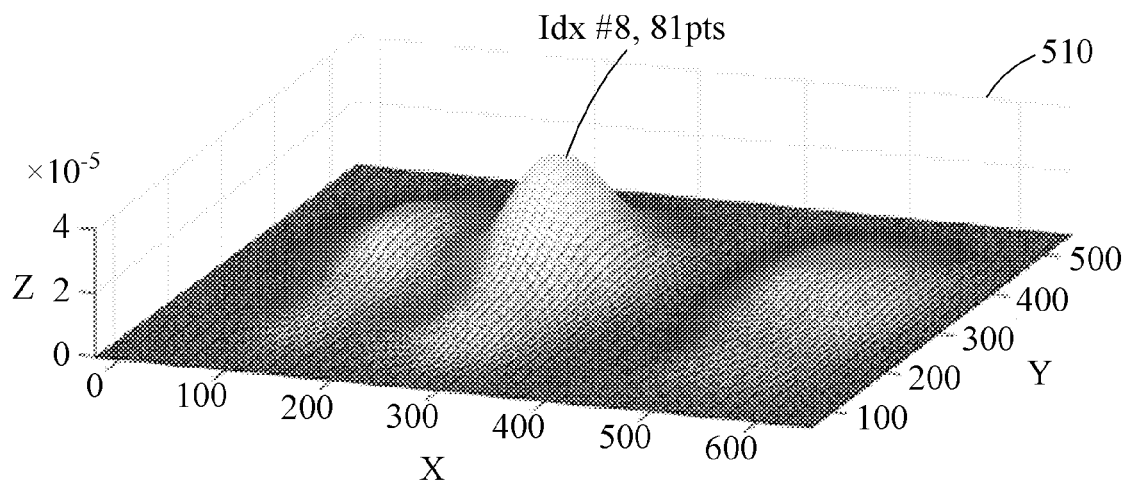
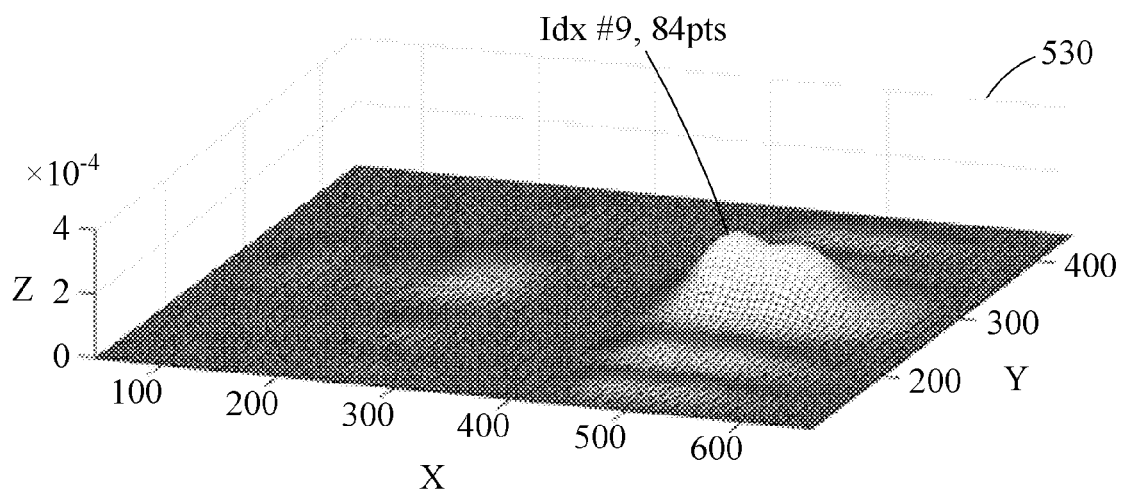

METHOD AND APPARATUS FOR RECOGNIZING OBJECT BASED ON VOCABULARY TREE

CROSS-REFERENCE TO RELATED APPLICATION(S)

This application claims the benefit under 35 USC § 119(a) of Korean Patent Application No. 10-2017-0068427 filed on Jun. 1, 2017, in the Korean Intellectual Property Office, the entire disclosure of which is incorporated herein by reference for all purposes.

BACKGROUND

1. Field

The following description relates to a method and apparatus for recognizing an object based on a vocabulary tree.

2. Description of Related Art

To determine an object included in an input image, various methods may be used to recognize whether images registered in advance in a database are included in the input image.

When a portion in the input image is occluded due to, for example, overlapping, such methods may not correctly recognize the object. In addition, it may not be easy to recognize multiple objects in the input image, although recognizing a single object included in the input image may be possible. Although numerous training images may be needed to accurately recognize an object, these training images may not be readily applied to a mobile application due to a large data size of the training images.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In one general aspect, there is provided a method of recognizing an object, the method including obtaining, from an input image, feature points and descriptors corresponding to the feature points, determining indices of the feature points based on the descriptors, estimating a density distribution of feature points for each of the indices, and recognizing an object in the input image based on the estimated density distribution.

The determining of the indices of the feature points may include determining the indices of the feature points by applying the descriptors to a pretrained vocabulary tree.

The determining of the indices of the feature points may include calculating similarity scores between the feature points and a feature vector corresponding to each node of the vocabulary tree, and determining the indices of the feature points based on the similarity scores.

The calculating of the similarity scores may include calculating the similarity scores between the feature points and a feature vector corresponding to each node of the vocabulary tree using an Lp-norm.

The determining of the indices of the feature points based on the similarity scores may include sorting the similarity scores, and determining indices corresponding to a feature vector having a highest similarity score among the sorted similarity scores to be the indices of the feature points.

The recognizing of the object may include determining a representative index corresponding to at an object blob in the input image based on the estimating of the density distribution, and recognizing the object included in the input image based on the representative index.

The determining of the representative index may include determining the representative index based on a weighted sum of similarity scores between the feature points and a feature vector corresponding to each node of a vocabulary tree.

The estimating of the density distribution of the feature points may include estimating the density distribution of the feature points using kernel density estimation (KDE).

The recognizing of the object may include segmenting an object blob in the input image based on the estimating of the density distribution.

The segmenting of the object blob may include segmenting the object blob using a bounding box based on the estimating of the density distribution.

The obtaining of the feature points and the descriptors may include restricting an area of the input image, and obtaining the feature points and the descriptors from the restricted area.

In another general aspect, there is provided a method of recognizing an object, the method including determining coordinates of each of feature points extracted from an input image, segmenting an object blob in the input image based on the coordinates of each of the feature points, determining indices of feature points in the object blob using descriptors corresponding to the feature points, and recognizing an object in the input image using the indices of the feature points.

The segmenting of the object blob may include segmenting the object blob by clustering the feature points based on the coordinates of each of the feature points.

The determining of the indices of the feature points may include determining the indices of the feature points by applying, to a pretrained vocabulary tree, the descriptors corresponding to the feature points in the object blob.

The determining of the indices of the feature points may include calculating similarity scores between the feature points and a feature vector corresponding to each node of the vocabulary tree, and determining the indices of the feature points based on the similarity scores.

The recognizing of the object may include determining a representative index corresponding to the object blob, and recognizing the object included in the input image based on the representative index.

The determining of the representative index may include counting a number for each of the indices of the feature points, and determining the representative index corresponding to the object blob based on the number for each of the indices.

In another general aspect, an apparatus for recognizing an object, the apparatus including a communication interface configured to receive an input image, a memory configured to store a pretrained vocabulary tree, and a processor configured to obtain, from the input image, feature points and descriptors corresponding to the feature points, to determine indices of the feature points by applying the descriptors to the vocabulary tree, to estimate a density distribution of feature points for each of the indices of the feature points, and to recognize an object in the input image.

The processor may be configured to calculate similarity scores between the feature points and a feature vector corresponding to each node of the vocabulary tree, and to determine the indices of the feature points based on the similarity scores.

Other features and aspects will be apparent from the following detailed description, the drawings, and the claims.

BRIEF DESCRIPTION OF THE DRAWINGS

FIG. 5 is a diagram illustrating an example of a method of determining a representative index.

Figure 1:
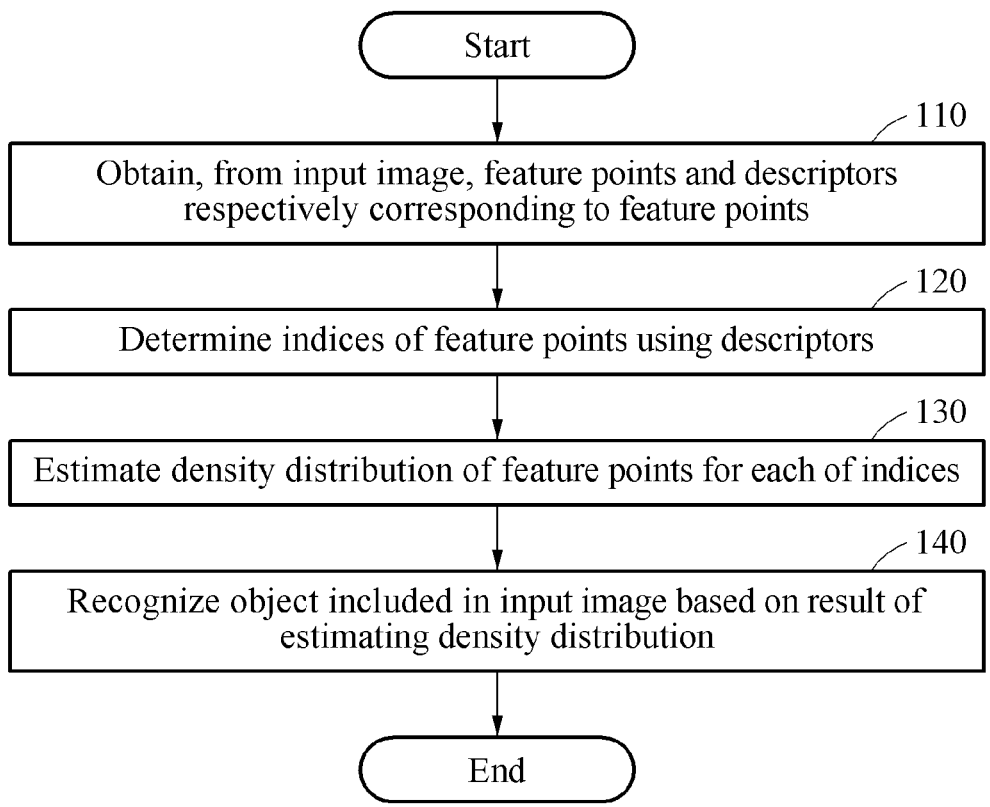
FIG. 1 is a diagram illustrating an example of a method of recognizing an object.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise.

Same elements in the drawings will be designated by the same reference numerals, wherever possible, even though they are shown in different drawings.

FIG. 1 is a diagram illustrating an example of a method of recognizing an object. An apparatus for recognizing an object, hereinafter simply referred to as a recognition apparatus, may perform object recognition by determining an object included in an input image, and segmenting an object blob corresponding to the determined object. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer that perform the specified functions, or combinations of special purpose hardware and computer instructions.

Figure 2:
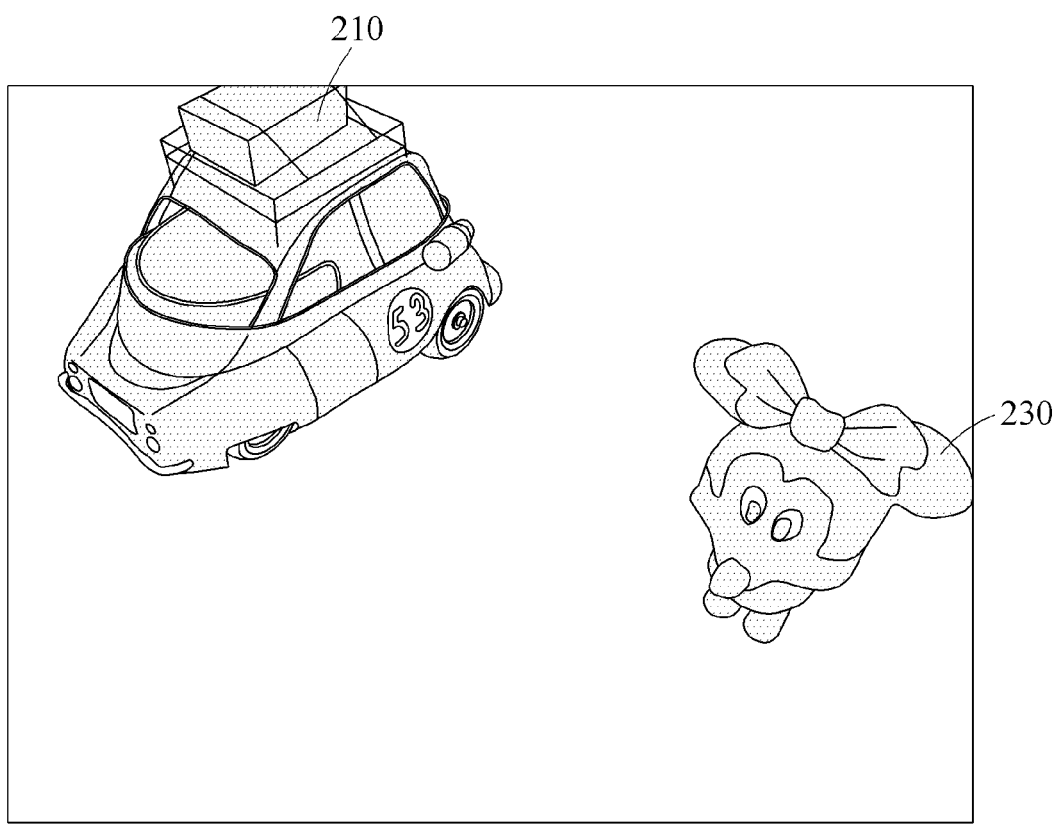
FIG. 2 is a diagram illustrating an example of an input image.

Referring to FIG. 1, in operation 110, the recognition apparatus obtains, from an input image, feature points and descriptors respectively corresponding to the feature points. For example, as illustrated in FIG. 2, the recognition apparatus extracts feature points of objects included in an input image 200. The feature points may include, for example, corner points, that are used to determine an object when tracking or recognizing the object in an image.

To extract the feature points from the input image, the recognition apparatus uses well-known feature point detecting methods, such as, for example, a scale invariant feature transform (SIFT) method, a speeded up robust features (SURF) method, and a binary robust independent elementary features (BRIEF) method.

The descriptors correspond to the feature points, respectively, and are also referred to as feature vectors or visual words. In one example, the recognition apparatus obtains oriented features from accelerated segment test (FAST) and rotated BRIEF (ORB) descriptors respectively corresponding to the feature points using the feature point detecting methods described in the foregoing.

According to examples, the recognition apparatus restricts an area in an input image from which feature points are to be extracted, and obtains the feature points and descriptors corresponding to the feature points from the restricted area.

For example, the recognition apparatus indicates, by a bounding box, a candidate area from an entire area of the input image in which an object to be recognized is estimated to be present, using an object proposal algorithm, and extract feature points from the candidate area indicated by the bounding box. Thus, the recognition apparatus implements a real time method of recognizing an object by reducing an amount of computation (or operations) and an amount of time used for the computation.

In operation 120, the recognition apparatus determines indices of the feature points using the descriptors. The recognition apparatus determines the indices of the feature points by applying the descriptors to a pretrained vocabulary tree. The recognition apparatus calculates similarity scores between the feature points and a feature vector corresponding to each node of the vocabulary tree, and determines the indices of the feature points based on the calculated similarity scores. For example, the recognition apparatus calculates the similarity scores between the feature points and a feature vector corresponding to each node of the vocabulary tree, using an Lp-norm.

According to examples, the recognition apparatus calculates an index and a similarity score of each feature point, and stores information associated with a {index, similarity score} pair of a corresponding feature point. The determination of an index of each feature point will be further described with reference to FIGS. 3 and 4.

In operation 130, the recognition apparatus estimates a density distribution of feature points for each of the indices. In an example, the recognition apparatus estimates the density distribution of the feature points through nonparametric density estimation, such as, for example, kernel density estimation (KDE).

In operation 140, the recognition apparatus recognizes an object included in the input image based on a result of estimating the density distribution. The recognition apparatus determines a representative index corresponding to an object blob included in the input image based on the result of estimating the density distribution.

In an example, the recognition apparatus determines the representative index by estimating a density distribution of feature points belonging to each of the indices. In another example, the recognition apparatus determines the representative index based on a weight sum of the calculated similarity scores between the feature points and a feature vector corresponding to each node of the vocabulary tree.

In another example, the recognition apparatus determines a representative index corresponding to an object blob corresponding to clustered feature points, by performing clustering on the feature points and using the clustered feature points. The object blob may correspond to a partial area of the input image that includes the clustered feature points.

The recognition apparatus counts a number for each of indices of the clustered feature points, and determines the representative index based on the number for each of the indices. For example, the recognition apparatus determines, to be the representative index, an index having a greatest number among counted indices. The determination of a representative index will be further described reference to FIG. 5.

The recognition apparatus recognizes the object by segmenting the object blob based on the result of estimating the density distribution. For example, the recognition apparatus segments the object blob included in the input image using the bounding box based on the result of estimating the density distribution.

The recognition apparatus recognizes the object included in the input image based on the representative index.

The recognition one of the object included in an input image will be described in further detail with reference to FIG. 6.

In general, object recognition refers to determining whether a given object is known or experienced before, and identifying what the object is, for example, whether the object is a shoe or a doll. Object retrieval refers to a process of searching a database (DB) for related information based on information of a recognized object. The term "object recognition" used herein is construed as including both the meanings of the object recognition and the object retrieval described in the foregoing.

FIG. 2 is a diagram illustrating an example of an input image. FIG. 2 illustrates the input image 200 includes two objects, for example, a toy car 210 and a Minnie Mouse doll 230.

In an example, the input image 200 is a grayscale two-dimensional (2D) image. The input image 200 may include a plurality of objects including, for example, the toy car 210 and the Minnie Mouse doll 230 as illustrated in FIG. 2, or a single object.

Figure 3:
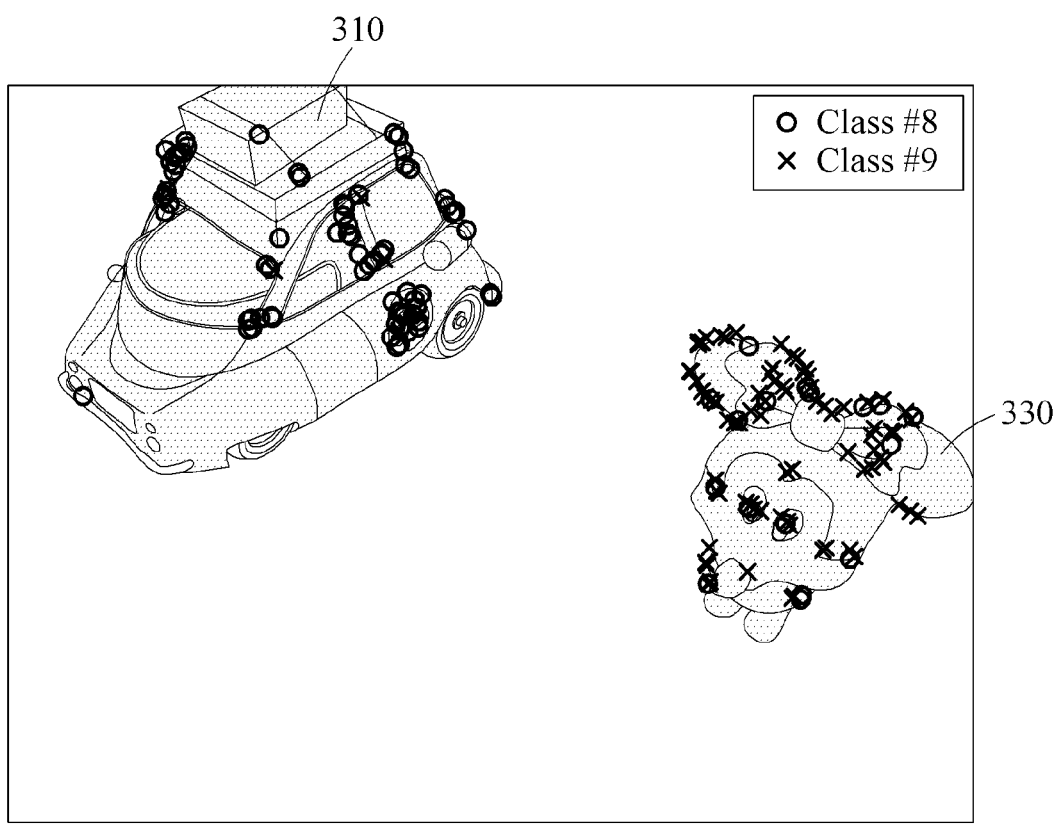
FIGS. 3 and 4 are diagrams illustrating examples of a method of determining indices of feature points.
Figure 4:
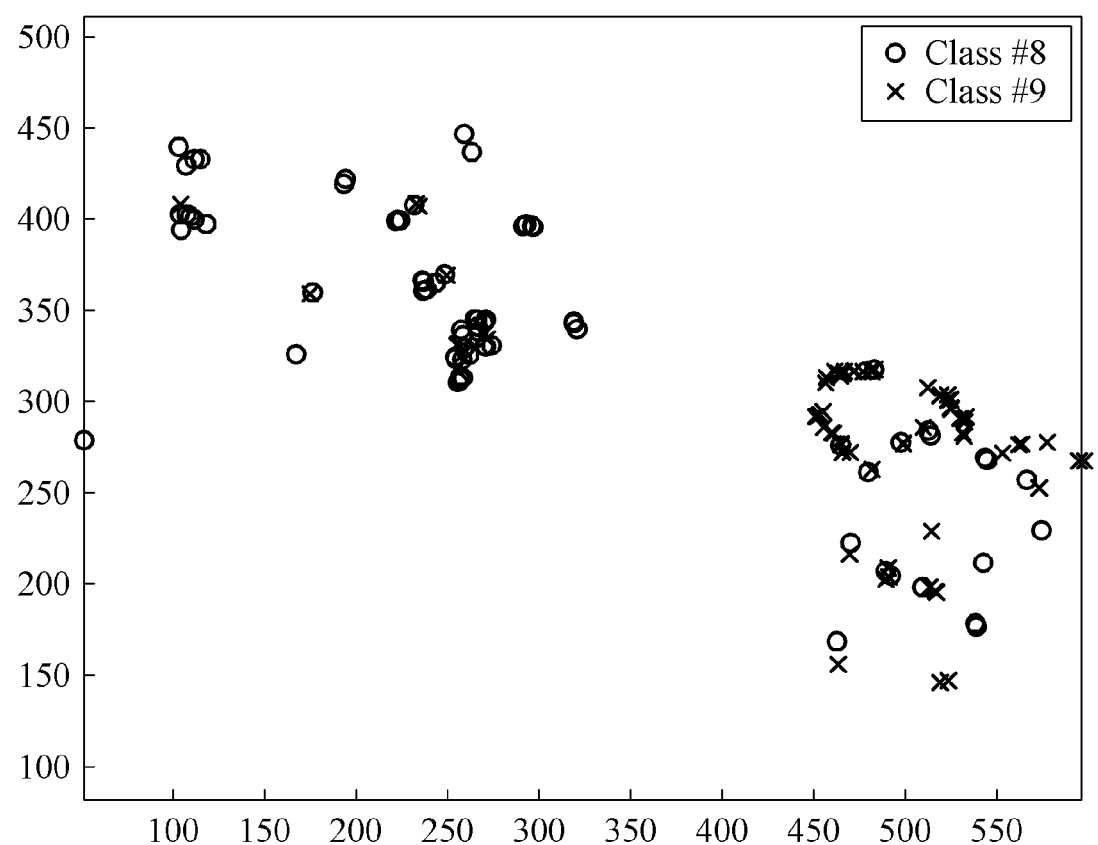

FIGS. 3 and 4 are diagrams illustrating examples of a method of determining indices of feature points. FIG. 3 illustrates a toy car 310 and a Minnie Mouse doll 330 labeled with index values.

Descriptors corresponding to feature points, for example, the feature points obtained in operation 110 described with reference to FIG. 1, may be transferred up to a node at a last end based on a dot product in association with a feature vector corresponding to each node of a pretrained vocabulary tree. In an example, the recognition apparatus determines an index of each of the feature points based on a similarity between a movement path of feature points of prestored target objects and a movement path of the feature points obtained from the input image.

In an example example, the recognition apparatus calculates similarity scores in association with the prestored target objects based on a movement path of each feature point, and sorts the calculated similarity scores. The recognition apparatus determines, to be indices of the feature points, an index corresponding to an object having a highest similarity score among the sorted similarity scores. Thus, the feature points may have corresponding index values.

In an example, the recognition apparatus calculates the similarity scores using an Lp-norm as represented by Equation 1.

$$\|q - d\|_p^p = \sum_j |q_i - d_i|^p \qquad \text{[Equation 1]}$$
$$= 2 + \sum_{i|q_i \neq 0, d_i \neq 0} (|q_i - d_i|^p - |q_i|^p - |d_i|^p)$$

In Equation 1, q denotes a query, which corresponds to a feature vector configured with features corresponding to a movement path, for example, a movement node i, of a feature point extracted from an input image. d denotes a feature vector of a class in a DB stored in association with the movement path. p denotes a constant to define a function space. Here, the class may correspond to a key frame or an object to be sought.

For example, in a case in which an L1-norm, where p is 1 (p=1), is used and multiple classes are stored in the DB, Equation 1 is represented as Equation 2.

$$2 + \sum_{i|q_i \neq 0, d_i \neq 0} (|q_i - d_{j,i}| - |q_i| - |d_{j,i}|) \quad \text{[Equation 2]}$$

In Equation 2, a feature value $q_i$, or a feature vector, of a query corresponding to a node i is defined by a weight $w_i$ of the node i in the vocabulary tree, and the weight $w_i$ has a scalar value. In addition, a feature value $d_{ji}$ of a j-th class in the node i is defined by (a ratio of feature points of the j-th class corresponding to the node i, for example, 0-1)×(the weight $w_i$ of the node i).

For example, when using the L1-norm, a thresholding operation used in one example may have a distribution as in soft thresholding. Here, when $d_{ij}$ is equal to $q_i$, an absolute output value may be a maximum. When $d_{ij}$ is less than $q_i$, the absolute output value may be reduced, gradually to 0. That is, when the ratio of the feature points of the j-th class in the node i, for example, the ratio is closer to 1, $d_{ji}$ and $q_i$ may become similar to each other, which indicates a great probability of the feature value $q_i$, or the feature vector, corresponding to the node i of the vocabulary tree being the j-th class.

In an example, the recognition apparatus may not perform summation on results of Equation 1 with respect to all n feature points, but assign a corresponding result to each of the feature points as a characteristic. Thus, each of the feature points may have a value corresponding to a related class, and the value may be an index of each of the feature points.

For example, when a value corresponding to a class of the toy car 310 is 8, and a value corresponding to a class of the Minnie Mouse doll 330 is 9, feature points corresponding to class 8 and class 9 are illustrated as shown in FIG. 4.

FIG. 5 is a diagram illustrating an example of a method of determining a representative index. FIG. 5 illustrates a density distribution 510 of feature points having an index, for example, Idx #8, and a density distribution 530 of feature points having an index, for example, Idx #9.

The indices of the feature points illustrated in FIGS. 3 and 4 may be determined to be incorrect values due to noise that may occur for various reasons, such as, for example, a lack of robustness of descriptors due to, for example, incorrect learning or training, an insufficient number of times for training, rotations, and a change in illumination.

In an example, the noise that may occur for such reasons may be removed by determining a representative index corresponding to an object blob in an input image.

The recognition apparatus determines a representative index corresponding to an object blob in an input image based on a result of estimating a density distribution. In an example, an index with a highest density distribution of feature points is determined to be the representative index corresponding to the object blob.

For example, as illustrated, in the density distribution 510 of the feature points obtained through density estimation, the index Idx #8 has a highest estimated value, for example, 81 points (pts), in an area corresponding to 250-300 on an x axis and 250-300 on a y axis.

In such an example, a representative index of a corresponding object is determined to be #8 based on the density distribution 510, and the object with the representative index of #8 is a toy car. Thus, the recognition apparatus determines that it is highly likely that the toy car is present in the area corresponding to 250-300 on the x axis and 250-300 on the y axis.

In the density distribution 510, values in other areas excluding the area corresponding to 250-300 on the x axis and 250-300 on the y axis may correspond to a distribution that is generated by misrecognition. The recognition apparatus may remove a density distribution of values less than a threshold through thresholding.

For example, as illustrated, in the density distribution 530 of the feature points obtained through density estimation, the index Idx #9 has a highest estimated value, for example, 84 pts, in an area corresponding to 450-600 on an x axis and 220-300 on a y axis.

In such an example, a representative index of a corresponding object is determined to be #9 based on the density distribution 530. Here, the object with the representative index of #9 is a Minnie Mouse doll. Thus, the recognition apparatus determines that it is highly likely that the Minnie Mouse doll is present in the area corresponding to 450-600 on the x axis and 220-300 on the y axis.

Figure 6:
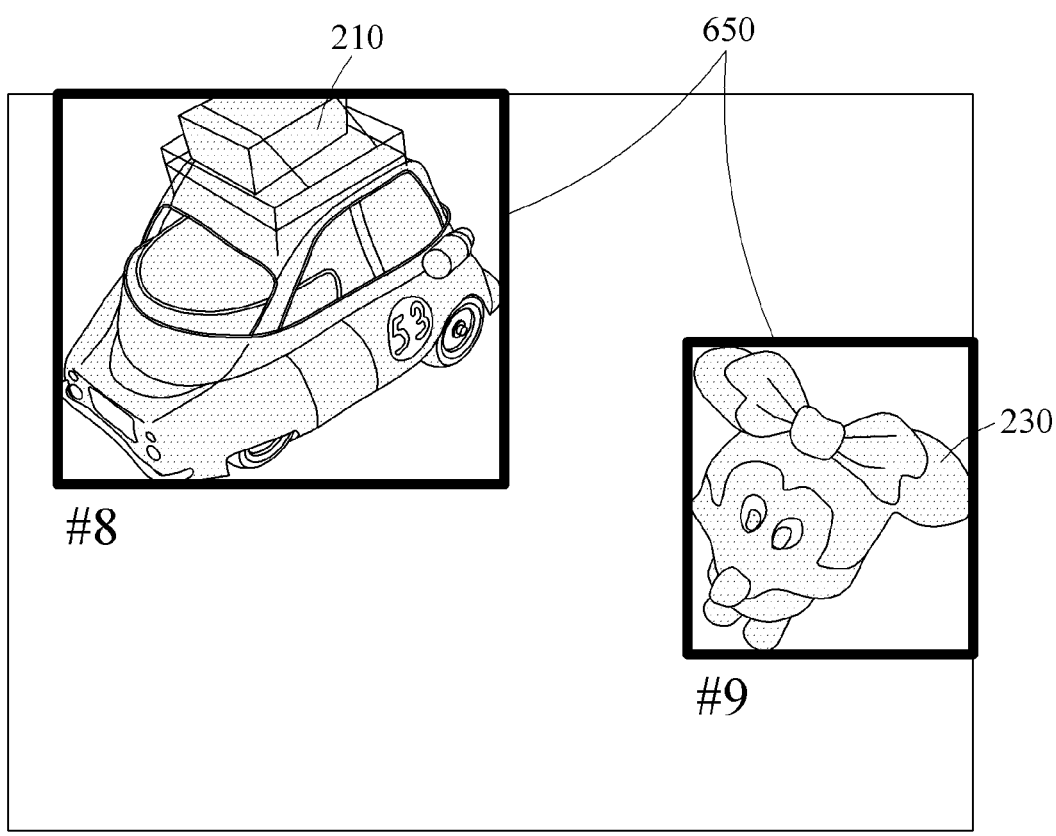
FIG. 6 is a diagram illustrating an example of a method of recognizing at least one object included in an input image.

FIG. 6 is a diagram illustrating an example of a method of recognizing an object included in an input image. FIG. 6 illustrates a toy car 210 and a Minnie Mouse doll 230, which are distinguished by a bounding box 650.

The recognition apparatus segments an object blob included in an input image by analyzing a result of estimating a density distribution described with reference to FIG. 5. The recognition apparatus segments the object blob included in the input image using the bounding box 650 based on the result of estimating the density distribution, and recognizes the object in the input image, for example, the toy car 210 and the Minnie Mouse doll 230 as illustrated.

The bounding box 650 may be tracked in a subsequent frame, and thus a calculation may not be needed for each frame. For example, a tracking-learning-detection (TLD) framework or a kernelized correlation filter (KCF) tracker may be used to track the bounding box 650.

Figure 7:
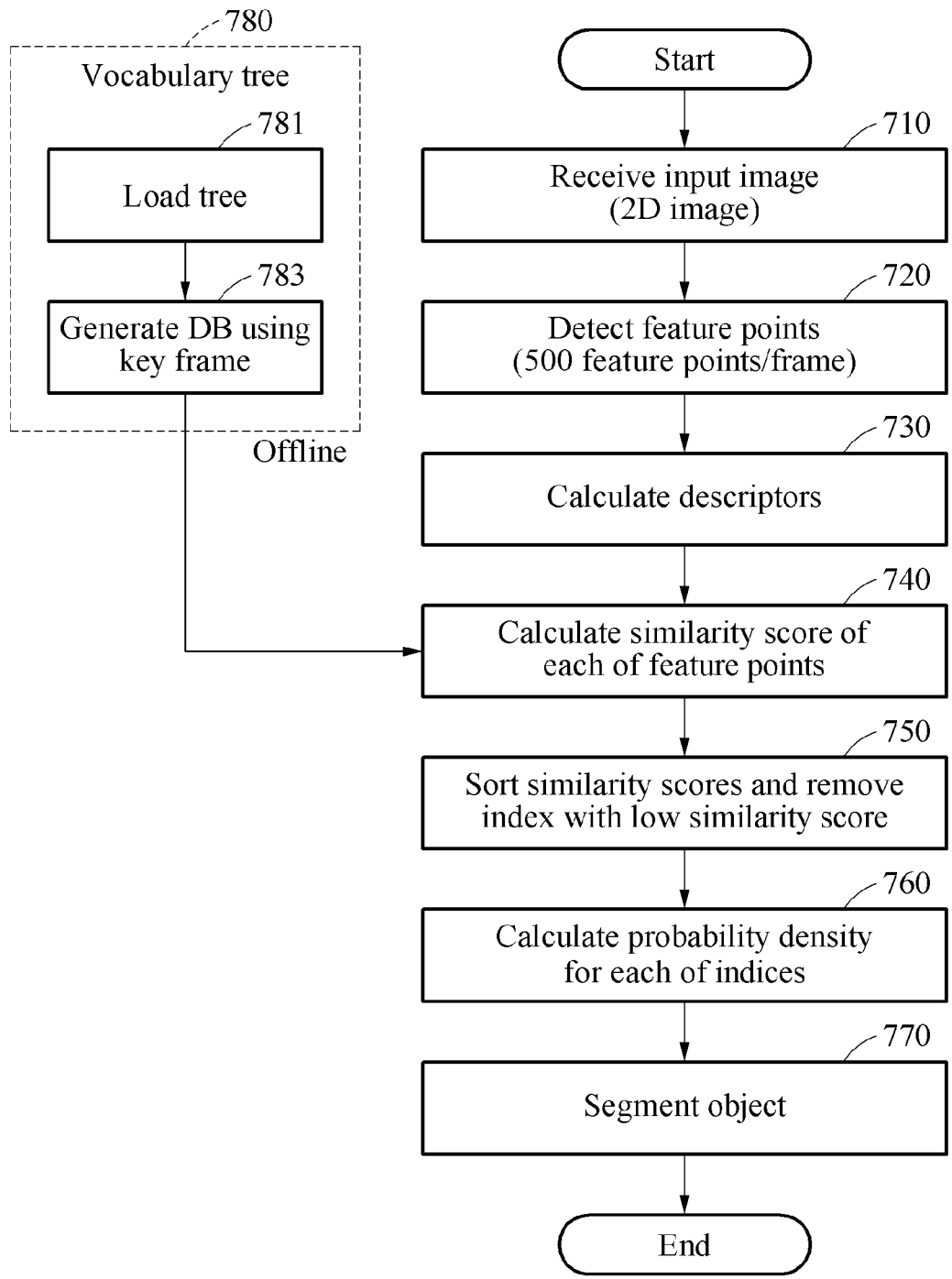
FIG. 7 is a diagram illustrating an example of a method of recognizing an object.

FIG. 7 is a diagram illustrating another example of a method of recognizing an object. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 is also applicable to FIG. 7, and are incorporated herein by reference. Thus, the above description may not be repeated here.

Referring to FIG. 7, in operation 710, the recognition apparatus receives an input image. The input image may be, for example, a two-dimensional (2D) image.

In operation 720, the recognition apparatus detects feature points in the input image. For example, as illustrated, the recognition apparatus detects 500 feature points in one frame of the input image.

In operation 730, the recognition apparatus calculates, or obtains, descriptors respectively corresponding to the feature points.

In operation 740, the recognition apparatus calculates a similarity score of each of the feature points by allowing the feature points detected in operation 720 to pass through a pretrained vocabulary tree 780, or pass along a movement path of the vocabulary tree 780. In an example, the vocabulary tree 780 is stored in advance through an offline process. For example, the vocabulary tree 780 is configured through operation 781 of loading a tree, or a data structure, and operation 783 of generating a DB by applying features, or feature points, of a key frame corresponding to an object to be sought to the tree loaded in operation 781. In an example, the vocabulary tree 780 is configured by hierarchically quantizing descriptors corresponding to the features, or the feature points, of the key frame, from a root of the tree to a leaf of the tree.

In operation 750, the recognition apparatus sorts similarity scores in a sequential order, and removes an index with a low similarity score to determine indices of the feature points.

In operation 760, the recognition apparatus calculates a probability density for each of the indices. In an example, the recognition apparatus calculates the probability density for each of the indices using a probability density function.

In operation 770, the recognition apparatus segments an object based on the probability density for each of indices that is calculated in operation 760, and recognizes the object included in the input image.

In one example, object recognition is performed based on a feature, or a feature point, in lieu of a scene unit, and thus issues related to an occlusion and a scale may be overcome.

Figure 8:
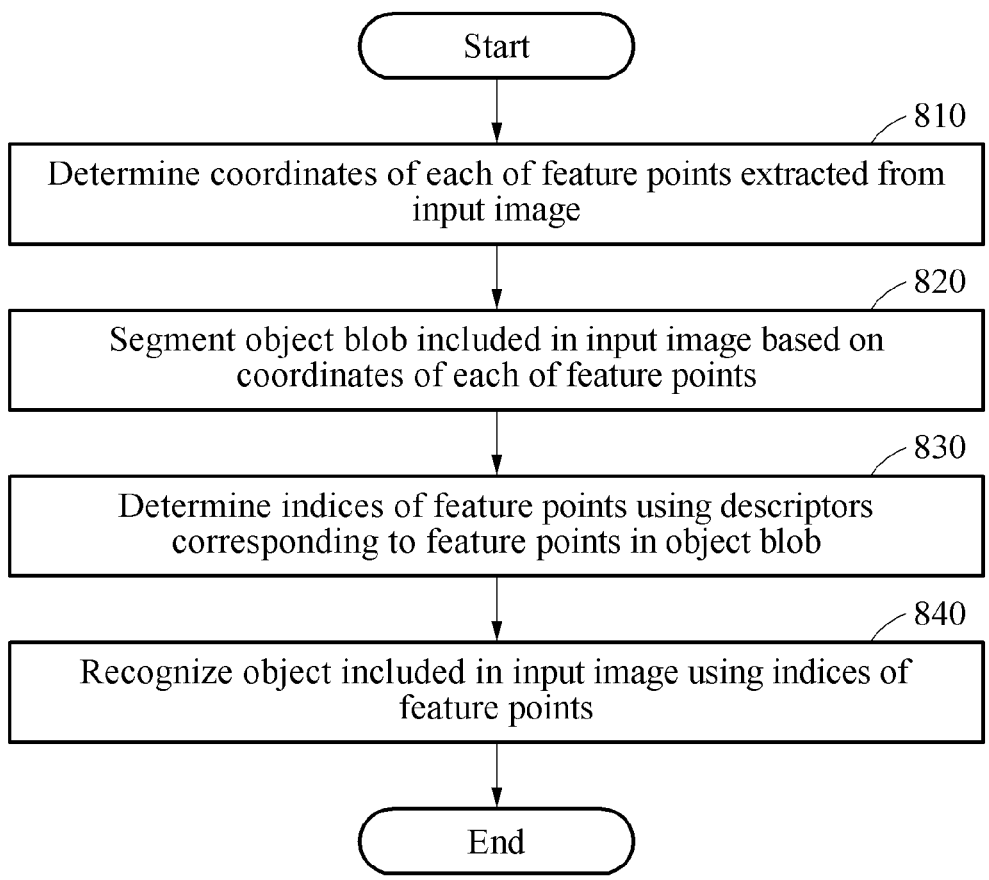
FIG. 8 is a diagram illustrating an example of a method of recognizing an object.

FIG. 8 is a diagram illustrating an example of a method of recognizing an object. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 is also applicable to FIG. 7, and are incorporated herein by reference. Thus, the above description may not be repeated here. The recognition apparatus may segment an object blob included in an input image, and recognize the segmented object blob.

Referring to FIG. 8, in operation 810, the recognition apparatus determines coordinates of each of feature points extracted from an input image. In an example, the input image is a 2D image, and the coordinates are (x, y) coordinates. The coordinates of each of the feature points extracted from the input image is illustrated as in a graph 900 of FIG. 9.

In operation 820, the recognition apparatus segments an object blob included in the input image based on the coordinates determined in operation 810. The recognition apparatus segments the object blob included in the input image by performing clustering on the feature points based on the coordinates of each of the feature points.

The recognition apparatus performs the clustering on the feature points through unsupervised clustering such as, for example, K-means clustering. The unsupervised clustering may be used to classify or distinguish an object without any knowledge about each class to be classified, and classify clusters based on a similarity. To determine the similarity between the clusters, various distance, or similarity, measurement functions using, for example, a Euclidean distance, a Mahalanobis distance, a Lance-Williams distance, and a Hamming distance may be used.

Figure 10:
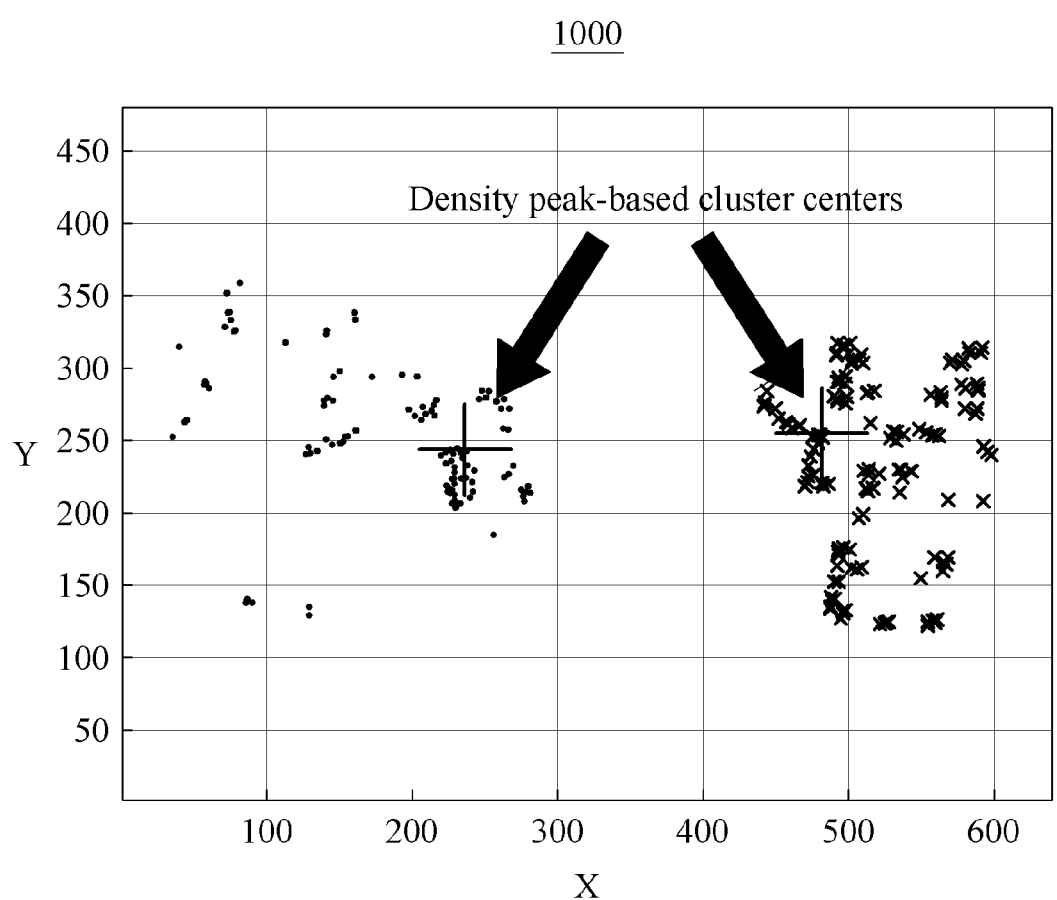

According to examples, in a case in which a value of K is not known in the K-means clustering, the recognition apparatus performs the clustering based on a peak value in a density distribution as illustrated in FIG. 10.

In operation 830, the recognition apparatus determines indices of feature points in the object blob, using descriptors corresponding to the feature points. The recognition apparatus determines the indices of the feature points by applying the descriptors corresponding to the feature points in the object blob to a pretrained vocabulary tree.

For example, the recognition apparatus calculates similarity scores between the feature points and a feature vector corresponding to each node of the vocabulary tree, and determines the indices of the feature points based on the similarity scores.

The recognition apparatus sorts the similarity scores, and determines an index corresponding to a feature vector having a highest similarity score among the sorted similarity stores to be the indices of the feature vectors. The recognition apparatus obtains a {index, similarity score} pair by using the descriptors of the feature points in the object blob.

In operation 840, the recognition apparatus recognizes an object included in the input image using the indices of the feature points determined in operation 830. For example, the recognition apparatus determines a representative index corresponding to the object blob, and recognizes the object included in the input image based on the determined representative index.

For example, the recognition apparatus counts a number for each of the indices of the feature points, and recognizes the object corresponding to the object blob based on the number for each of the indices.

Figure 9:
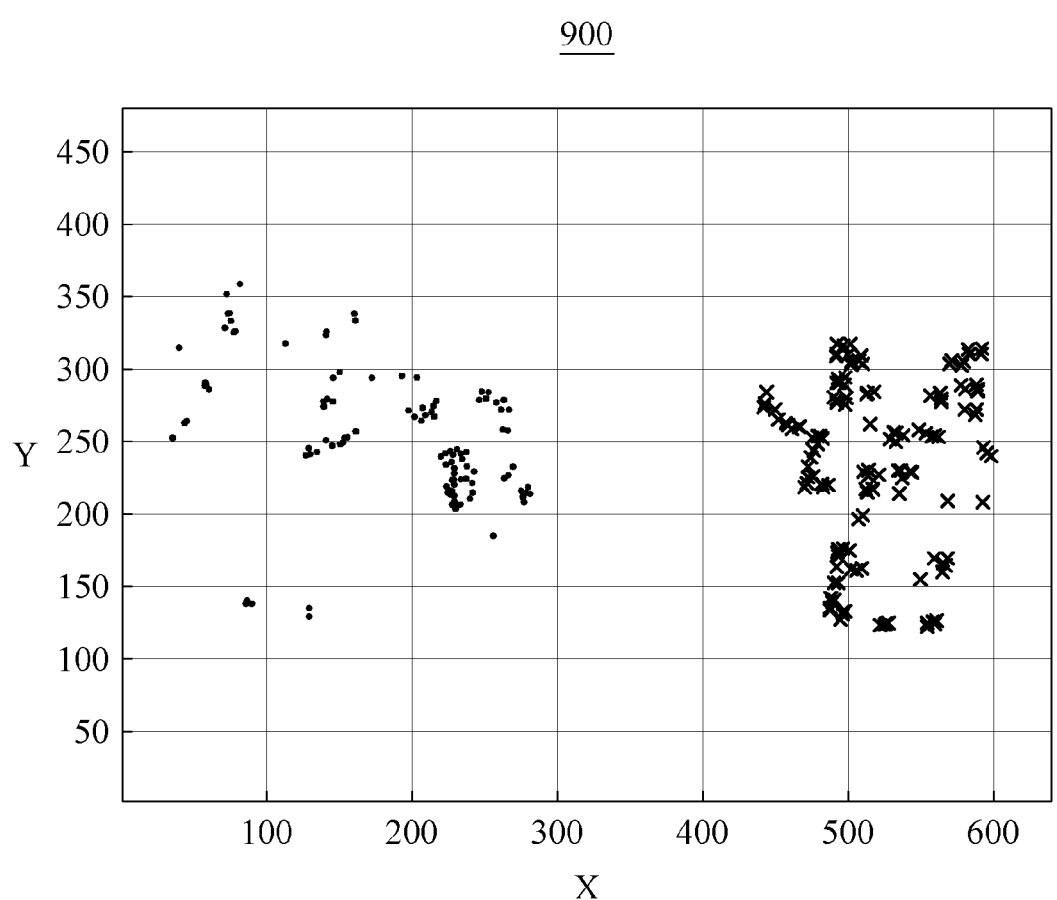
FIGS. 9 through 11 are diagrams illustrating examples of a method of recognizing an object.

FIG. 9 is a diagram illustrating an example of feature points extracted from an input image. FIG. 9 illustrates the graph 900 indicating coordinates of the extracted feature points.

FIG. 10 is a diagram illustrating an example of a method of segmenting an object blob included in an input image. FIG. 10 illustrates a graph 1000 in which a peak in a density distribution of feature points is indicated by "+."

When a value of K is not known in the K-means clustering described above, the recognition apparatus segments an object blob using a peak value in a density distribution of feature points.

As illustrated in FIG. 10, the recognition apparatus segments the object blob by determining a point indicating a peak value in the density distribution to be a center of a cluster and distinguishing an area separate from the point by a certain distance.

Figure 11:
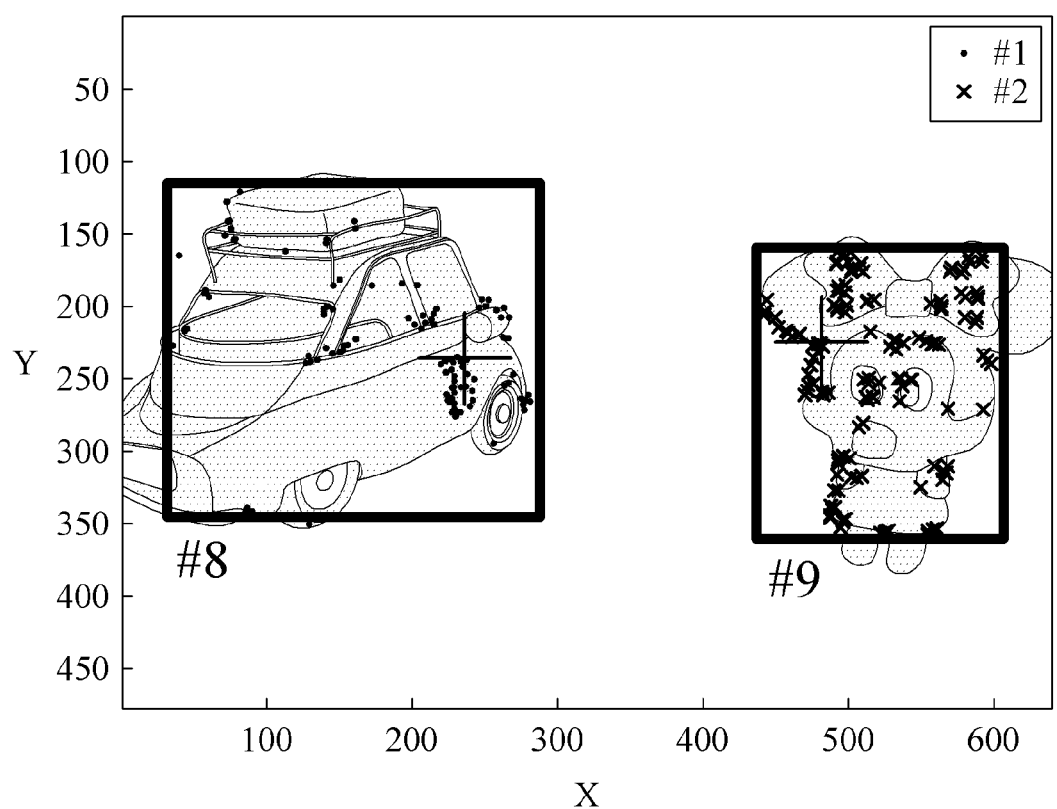

FIG. 11 is a diagram illustrating an example of a method of recognizing an object included in an input image. FIG. 11 illustrates a toy car recognized by index #8, and a Minnie Mouse doll recognized by index #9.

When an object blob is segmented through the clustering described above, the recognition apparatus determines a representative index corresponding to the object blob. For example, the recognition apparatus counts a number for each of indices included in the object blob, or obtains a weighted sum of similarity scores of feature points included in the object blob by accumulating the similarity scores to determine the representative index.

Figure 12:
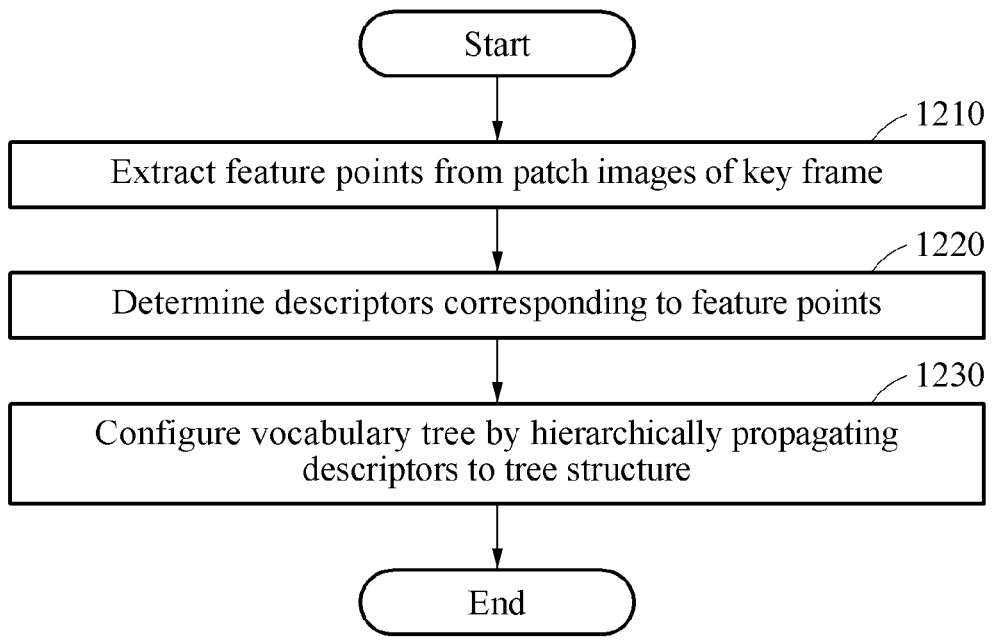
FIG. 12 is a diagram illustrating an example of a method of configuring a vocabulary tree.

FIG. 12 is a diagram illustrating an example of a method of configuring a vocabulary tree. Referring to FIG. 12, in operation 1210, the recognition apparatus extracts feature points from patch images of at least one key frame to be recognized.

In operation 1220, the recognition apparatus determines descriptors corresponding to the extracted feature points. In operation 1230, the recognition apparatus configures a vocabulary tree by hierarchically propagating the descriptors to a tree structure.

The configuration of a vocabulary tree by the recognition apparatus will be further described with reference to FIG. 14.

Figure 13:
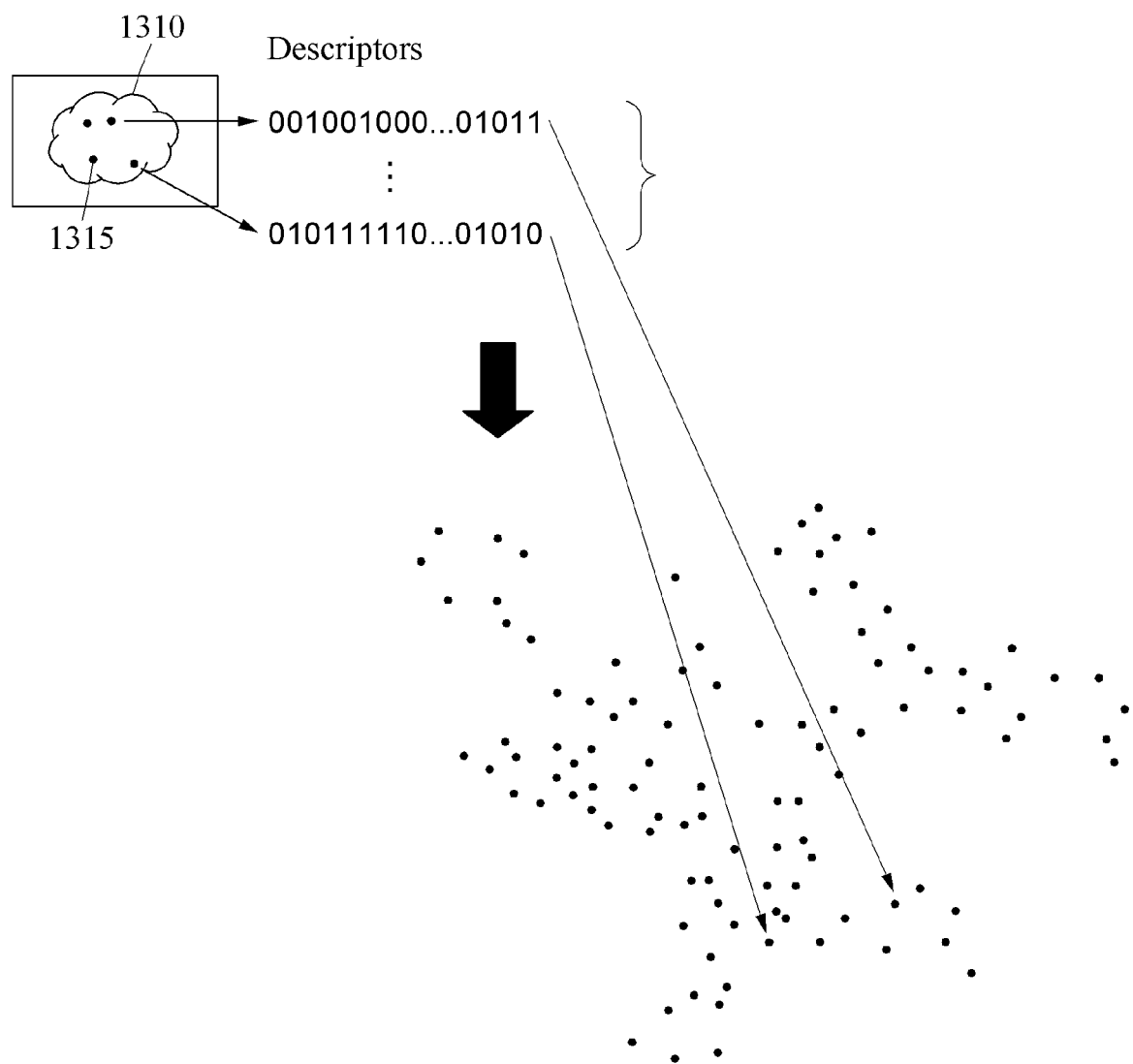
FIG. 13 is a diagram illustrating an example of descriptors respectively corresponding to feature points.

FIG. 13 is a diagram illustrating an example of descriptors respectively corresponding to feature points. FIG. 13 illustrates an object 1310 included in an input image, feature points 1315 extracted from the object 1310, and descriptors corresponding to the feature points 1315.

The descriptors correspond to feature vectors that describe features corresponding to the feature points 1315. For example, as illustrated, the descriptors are provided in a 256 bit binary form, for example, 001001000 . . . 01011 and 010111110 . . . 01010. However, the form of the descriptors is not limited to the illustrated example, and other forms of descriptors are considered to be well within the scope of the present disclosure.

Figure 14:
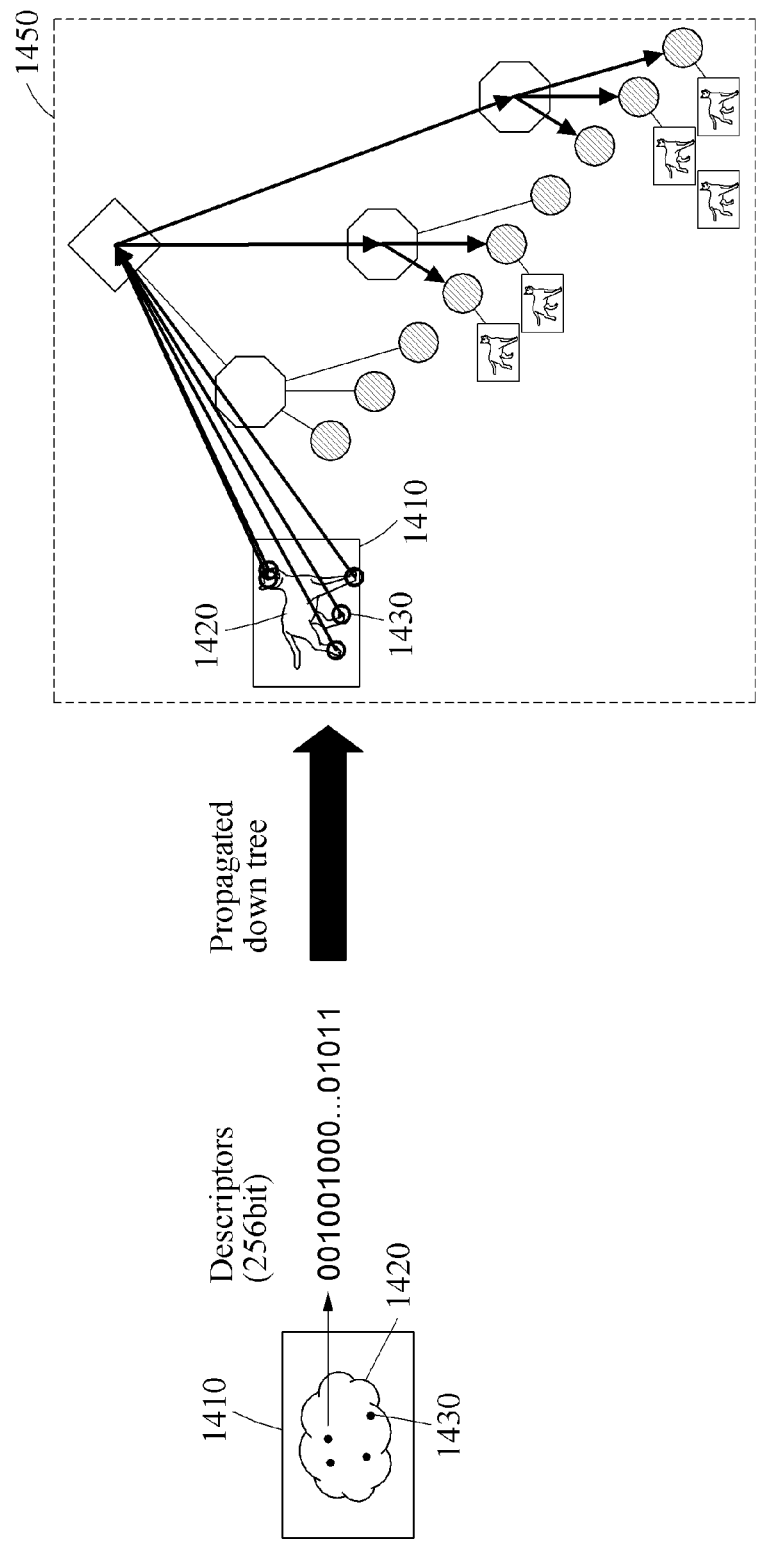
FIG. 14 is a diagram illustrating an example of a method of configuring a vocabulary tree.

FIG. 14 is a diagram illustrating an example of a method of configuring a vocabulary tree. FIG. 14 illustrates a process of adding an image to a vocabulary tree by applying a descriptor to a tree DB structure.

Referring to FIG. 14, an object 1420 included in a key frame 1410 corresponding to an image to be sought includes a feature point 1430, and a descriptor corresponding to the feature point 1430 is 001001000 . . . 01011.

The recognition apparatus hierarchically propagates the descriptor 001001000 . . . 01011 from a root node to a leaf node of a provided tree 1450 of, for example, a DB structure.

The recognition apparatus calculates a similarity between the descriptor 001001000 . . . 01011 and each node of the tree 1450 based on a Hamming distance, and maps the descriptor 001001000 . . . 01011 to a node having a high similarity.

Here, the recognition apparatus configures a vocabulary tree by storing key frame in the leaf node.

Figure 15:
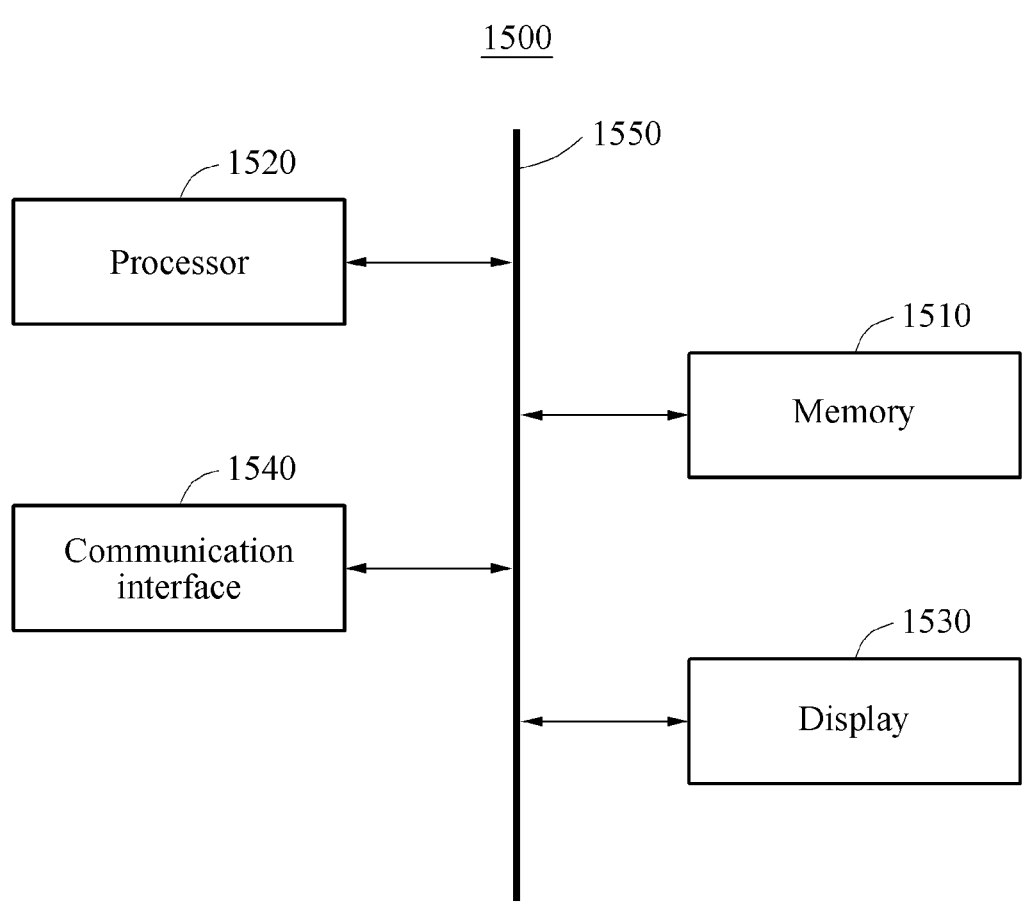
FIG. 15 is a diagram illustrating an example of an apparatus for recognizing an object.

FIG. 15 is a diagram illustrating an example of a recognition apparatus for recognizing an object. Referring to FIG. 15, a recognition apparatus 1500 includes a memory 1510, a processor 1520, a display 1530, and a communication interface 1540. The memory 1510, processor 1520, display 1530, and communication interface 1540 may communicate with one another through a communication bus 1550.

The memory 1510 may store a pretrained vocabulary tree.

The processor 1520 may obtain, from an input image, feature points and descriptors respectively corresponding to the feature points, and determine indices of the feature points by applying the descriptors to the vocabulary tree. The processor 1520 may estimate a density distribution of feature points belonging to each of the indices of the feature points, and recognize an object included in the input image.

The processor 1520 may calculate similarity scores between the feature points and a feature vector corresponding to each node of the vocabulary tree. The processor 1520 may determine the indices of the feature points based on the similarity scores.

The communication interface 1540 may receive the input image.

In addition to the operations described in the foregoing, the processor 1520 may perform the method described with reference to FIGS. 1 through 14. The processor 1520 may implement a program, and control the recognition apparatus 1500. A program code of the program to be implemented by the processor 1520 may be stored in the memory 1510.

The memory 1510 may store information received through the communication interface 1530. The memory 1510 may be a volatile or a nonvolatile memory, and further details regarding the memory 1510 is provided below.

In an example, the recognition apparatus 1500 displays the recognized object on display 1530. In an example, the display 1530 is a physical structure that includes one or more hardware components that provide the ability to render a user interface and/or receive user input. The display 1530 can encompass any combination of display region, gesture capture region, a touch sensitive display, and/or a configurable area. In an example, the display can be embedded in the recognition apparatus 1500. In an example, the display 1530 is an external peripheral device that may be attached to and detached from the recognition apparatus 1500. The display 1530 may be a single-screen or a multi-screen display. A single physical screen can include multiple displays that are managed as separate logical displays permitting different content to be displayed on separate displays although part of the same physical screen. The display 1530 may also be implemented as an eye glass display (EGD), which includes one-eyed glass or two-eyed glasses. In an example, the display 1530 is a head-up display (HUD) or a vehicular infotainment system.

The apparatuses, units, modules, devices, and other components illustrated in FIG. 15 that perform the operations described herein with respect to FIGS. 1, 7, 8, and 12 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. The hardware components also access, manipulate, process, create, and store data in response to execution of the instructions or software. For simplicity, the singular term "processor" or "computer" may be used in the description of the examples described in this application, but in other examples multiple processors or computers may be used, or a processor or computer includes multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1, 7, 8, and 12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent after gaining a thorough understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of recognizing an object, the method comprising:
   obtaining, from an input image, feature points and descriptors corresponding to the feature points;
   determining indices of the feature points based on the descriptors, each index indicating a respective object class among a plurality of object classes;
   estimating a density distribution of feature points for each of the indices; and
   recognizing an object in the input image as an object class of the object classes based on a comparison of the estimated density distributions.

2. The method of claim 1, wherein the determining of the indices comprises:
   determining the indices of the feature points by applying the descriptors to a pretrained vocabulary tree.

3. The method of claim 1, wherein the obtaining of the feature points and the descriptors comprises:
   restricting an area of the input image; and
   obtaining the feature points and the descriptors from the restricted area.

4. The method of claim 1, wherein the recognizing of the object comprises:
   determining a representative index corresponding to at an object blob in the input image based on the estimating of the density distributions; and
   recognizing the object included in the input image based on the representative index.

5. The method of claim 4, wherein the determining of the representative index comprises:

determining the representative index based on a weighted sum of similarity scores between the feature points and a feature vector corresponding to each node of a vocabulary tree.

6. The method of claim 1, wherein each of the respective object classes corresponds to a respective type of object, among plural types of objects, of corresponding feature points.

7. The method of claim 6, wherein the plural types of objects include either one or both of a toy object type and a doll object type.

8. The method of claim 1, wherein the estimating of the density distributions of the feature points comprises:
   estimating the density distribution of the feature points using kernel density estimation (KDE).

9. The method of claim 8, wherein the recognizing of the object comprises:
   segmenting an object blob in the input image based on the estimated density distributions.

10. The method of claim 9, wherein the segmenting of the object blob comprises:
    segmenting the object blob using a bounding box based on the estimated density distributions.

11. A method of recognizing an object, the method comprising:
    obtaining, from an input image, feature points and descriptors corresponding to the feature points;
    determining indices of the feature points based on the descriptors;
    estimating a density distribution of feature points for each of the indices; and
    recognizing an object in the input image based on a comparison of the estimated density distributions,
    wherein the determining of the indices comprises determining the indices of the feature points by applying the descriptors to a pretrained vocabulary tree, and
    wherein the determining of the indices comprises, for each of a plurality of the feature points:
    calculating similarity scores between a descriptor corresponding to the feature point and feature vectors corresponding to nodes of the vocabulary tree; and
    determining the index of the feature point based on the similarity scores.

12. The method of claim 11, wherein the calculating of the similarity scores comprises:
    calculating the similarity scores using an Lp-norm.

13. The method of claim 11, wherein the determining of the index comprises, for the each of the plurality of the feature points:
    sorting the similarity scores; and
    determining an index of one of the nodes of the vocabulary tree corresponding to a highest similarity score among the sorted similarity scores to be the index of the feature point.

14. A method of recognizing an object, the method comprising:
    determining coordinates of feature points extracted from an input image;
    segmenting an object blob in the input image based on the coordinates of the feature points;
    determining indices of feature points in the object blob, from among the feature points, using descriptors corresponding to the feature points in the object blob, each index indicating a respective object class among a plurality of object classes; and
    recognizing an object in the input image as an object class of the object classes using a representative index selected from the indices of the feature points in the object blob.

15. The method of claim 14, wherein the recognizing of the object comprises:
    determining the representative index corresponding to the object blob; and
    recognizing the object included in the input image based on the representative index.

16. A non-transitory computer-readable storage medium storing instructions that, when executed by one or more processors, causes the one or more processors to perform the method of claim 1.

17. The method of claim 14, wherein the segmenting of the object blob comprises:
    segmenting the object blob by clustering the feature points based on the coordinates of the feature points.

18. The method of claim 14, wherein the determining of the indices comprises:
    determining the indices of the feature points in the object blob by applying, to a pretrained vocabulary tree, the descriptors corresponding to the feature points in the object blob.

19. The method of claim 18, wherein the determining of the indices comprises, for each of a plurality of the feature points in the object blob:
    calculating similarity scores between a descriptor corresponding to the feature point and feature vectors corresponding to nodes of the vocabulary tree; and
    determining the index of the feature point based on the similarity scores.

20. The method of claim 15, wherein the determining of the representative index comprises:
    counting a number of each of the indices of the feature points; and
    determining the representative index corresponding to the object blob based on the number of each of the indices.

21. An apparatus for recognizing an object, the apparatus comprising:
    a communication interface configured to receive an input image;
    a memory configured to store a pretrained vocabulary tree; and
    one or more processors configured to:
    obtain, from the input image, feature points and descriptors corresponding to the feature points,
    determine indices of the feature points by applying the descriptors to the vocabulary tree, each index indicating a respective object class among a plurality of object classes,
    estimate a density distribution of feature points for each of the indices of the feature points, and
    recognize an object in the input image as an object class of the object classes based on a comparison of the estimated density distributions.

22. The apparatus of claim 21, wherein the processor is further configured to, for the determining of the indices for each of a plurality of the feature points:
    calculate similarity scores between a descriptor corresponding to the feature point and feature vectors corresponding to nodes of the vocabulary tree, and
    determine the index of the feature point based on the similarity scores.

23. A method of recognizing an object, the method comprising:
- obtaining, from an input image, feature points and descriptors corresponding to the feature points;
- determining indices of the feature points based on the descriptors;
- estimating a density distribution of feature points for each of the indices; and
- recognizing an object in the input image based on a comparison of the estimated density distributions,
- wherein the recognizing of the object comprises:
  - selecting, based on the comparison, an index of the indices with a highest density distribution as a representative index corresponding to an object blob in the input image; and
  - recognizing the object included in the input image based on the representative index.

* * * * *